United States Patent
Ekong et al.

(10) Patent No.: US 12,117,804 B2
(45) Date of Patent: Oct. 15, 2024

(54) ELECTRIC MOTOR SPEED CONTROL APPARATUS AND ELECTRIC MOTOR SPEED CONTROL METHOD

(71) Applicant: TMEIC Corporation, Chuo-ku (JP)

(72) Inventors: Ufot Ufot Ekong, Tokyo (JP); Takumi Ito, Tokyo (JP); Masashi Nakamura, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 101 days.

(21) Appl. No.: 17/995,958

(22) PCT Filed: Oct. 27, 2020

(86) PCT No.: PCT/JP2020/040221
§ 371 (c)(1),
(2) Date: Oct. 11, 2022

(87) PCT Pub. No.: WO2022/091208
PCT Pub. Date: May 5, 2022

(65) Prior Publication Data
US 2023/0297075 A1    Sep. 21, 2023

(51) Int. Cl.
*G05B 19/4155*    (2006.01)

(52) U.S. Cl.
CPC ............ *G05B 19/4155* (2013.01); *G05B 2219/37473* (2013.01)

(58) Field of Classification Search
CPC ...... H02P 6/06; H02P 6/08; H02P 6/10; H02P 6/12; H02P 6/14; H02P 21/18; H02P 23/0027; H02P 23/07; H02P 25/022; H02P 25/062; H02P 25/064; H02P 27/06; H02P 27/08; H02P 29/50; H02P 23/14; H02P 23/16; H02P 21/14; H02P 27/026; H02P 23/04; G01P 3/44; G05B 2219/37473; G01R 31/2837; G01M 15/046

See application file for complete search history.

(56) References Cited

FOREIGN PATENT DOCUMENTS

| JP | 62-028813 A | 2/1987 | |
|---|---|---|---|
| JP | 10-023774 A | 1/1998 | |
| JP | 2004064833 A | * 2/2004 | ................ H02P 5/00 |

(Continued)

OTHER PUBLICATIONS

Takasaki Kazhuhiko, Motor Controller, Feb. 26, 2004, Clarivate Analytics, pp. 1-25. (Year: 2004).*

(Continued)

*Primary Examiner* — Antony M Paul
(74) *Attorney, Agent, or Firm* — Oblon, McClelland, Maier & Neustadt, L.L.P.

(57) ABSTRACT

The electric motor speed control apparatus in an embodiment comprises a rotation speed estimation unit and a control unit. The rotation speed estimation unit generates an estimated value of a rotation speed of an electric motor by using a result of FFT analysis of a speed detection signal ωFBK, which is based on a detection result from a resolver for detecting the rotation speed of the electric motor, and the speed detection signal ωFBK. The control unit implements speed control so as to reduce deviation between the estimated value of the rotation speed and a speed command value for speed control of the electric motor.

8 Claims, 5 Drawing Sheets

(56) References Cited

FOREIGN PATENT DOCUMENTS

JP  2016-16909 A  2/2016

OTHER PUBLICATIONS

Japanese Office Action issued on Apr. 25, 2023 in Japanese Patent Application No. 2022-521258 (with unedited computer-generated English translation), 11 pages.
International Search Report issued in Dec. 15, 2020 in PCT/JP2020/040221 filed on Oct. 27, 2020, 4 pages (with English Translation).

* cited by examiner

ELECTRIC MOTOR SPEED CONTROL APPARATUS AND ELECTRIC MOTOR SPEED CONTROL METHOD

TECHNICAL FIELD

Embodiments of the present invention relate to an electric motor speed control apparatus and an electric motor speed control method.

BACKGROUND ART

A resolver is an example of a "sensor (speed detector)" for detecting the rotation speed (angular velocity) of an electric motor (motor). There are electric motor speed control apparatuses that use a resolver to detect the rotation speed of an electric motor, and that use the detection result to control the speed of the electric motor. However, if the shaft of the resolver is eccentric with respect to the shaft of the electric motor, then an error sometimes arises in the detection result from the resolver, making it difficult to control the speed of the electric motor with high accuracy.

CITATION LIST

Patent Literature

[Patent Literature 1]
Japanese Unexamined Patent Application, First Publication No. 1998-23774

SUMMARY OF INVENTION

Technical Problem

An objective of the present invention is to provide an electric motor speed control apparatus and an electric motor speed control method that reduces the impact of the shaft of a resolver being eccentric with respect to the shaft of an electric motor when implementing speed control of the electric motor by detecting the speed of the electric motor by means of the resolver.

Solution to Problem

The electric motor speed control apparatus in an embodiment comprises a rotation speed estimation unit and a control unit. The rotation speed estimation unit generates an estimated value of a rotation speed of an electric motor by using a result of FFT analysis of a speed detection signal ωFBK, which is based on a detection result from a resolver for detecting the rotation speed of the electric motor, and the speed detection signal ωFBK. The control unit implements speed control so as to reduce deviation between the estimated value of the rotation speed and a speed command value for speed control of the electric motor.

DESCRIPTION OF EMBODIMENTS

Hereinafter, an electric motor speed control apparatus and an electric motor speed control method in an embodiment will be explained with reference to the drawings. The drawings are schematic or conceptual, and the distributions of the functions of the respective units and the like are not necessarily limited to being the same as they would be in reality.

In the description and the drawings in the present application, the features having identical or similar functions are assigned the same reference numbers. Furthermore, in some cases, redundant explanations of the features will be omitted.

In the embodiments, the expression "connected" includes being electrically connected. The expression "based on XX" means "based on at least XX", and may include the case of being based on other elements in addition to "XX". The expression "based on XX" is not limited to the case in which XX is directly used, and may include the case in which operations or processes are performed on XX. The expression "XX or YY" is not limited to the case of either XX or YY, and may include the case of both XX and YY. The same applies to cases in which there are three or more alternative elements. The expressions "XX" and "YY" are arbitrary elements (such as arbitrary information). The expression "inverter" refers to a power converter that outputs alternating current, including, for example, DC/AC converters and the like. The expression "electric motor" refers to rotating electric machines such as inductive electric motors that are driven by alternating-current power, and will hereinafter be referred to simply as a motor. The "rotation speed of the motor" may be referred to simply as the "speed of the motor".

First Embodiment

Figure 1:
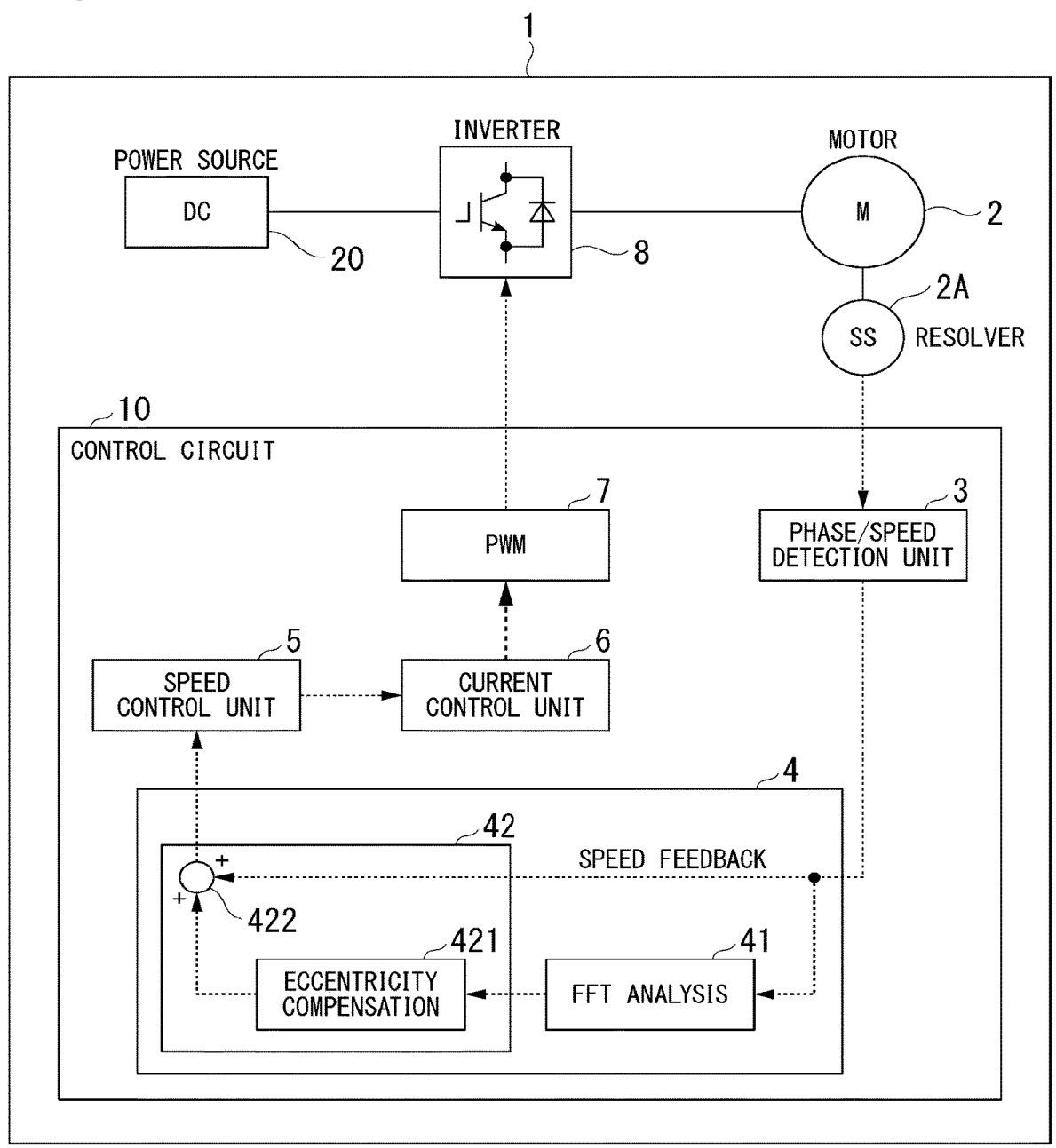
FIG. 1 is a block diagram illustrating an example of a motor drive system including an electric motor speed control apparatus according to a first embodiment.

FIG. 1 is a block diagram illustrating an example of a motor drive system 1 including an electric motor speed control apparatus according to the first embodiment. For example, the motor drive system 1 comprises an electric motor speed control apparatus 10.

The electric motor speed control apparatus 10 (indicated as "CONTROL CIRCUIT" in FIG. 1) is connected to a motor 2 (indicated as "MOTOR" in FIG. 1) and a resolver 2A (indicated as "SS" in FIG. 1). The electric motor speed control apparatus 10 controls the motor 2 so that the actual speed of the motor 2 detected by the resolver 2A matches a separately supplied speed command value.

The motor 2 comprises a plurality of windings, each winding being connected to an output of an inverter 8, to be described below. The inverter 8 is an example of a power converter. For example, the inverter 8 converts direct-current power supplied from a direct-current power source (indicated as "DC" in the drawings) to drive the motor 2. For example, when alternating current from the inverter 8 flows in the respective windings, the electromagnetic action causes the motor 2 to rotate. For example, a shaft of the resolver 2A is mechanically coupled to a shaft of the motor 2, and as the shaft of the motor 2 rotates, the shaft of the resolver 2A rotates in conjunction therewith. The positions of the motor 2 and the resolver 2A with respect to each other are adjusted so that the axis of rotation (center of rotation) of the motor 2 is aligned with the axis of rotation (center of rotation) of the resolver 2A. However, there are cases in which they are not perfectly positioned. A state in which the axis (center of rotation) of the motor 2 is not aligned with the axis (center of rotation) of the resolver 2A is called a state in which eccentricity has occurred. Eccentricity refers, for example, to the center of gravity (center of mass) of a rotating body being offset from the central axis of rotation.

For example, the electric motor speed control apparatus 10 is a control apparatus for the inverter 8 that drives the motor 2. The electric motor speed control apparatus 10 includes a phase/speed detection unit 3, a rotation speed estimation unit 4, a speed control unit 5, a current control unit 6 and a PWM control unit 7 (indicated as "PWM" in the drawings). The speed control unit 5, the current control unit 6 and the PWM control unit 7 are examples of a control unit.

The speed control unit 5 generates a drive torque command value by multiplying a prescribed speed response gain with a speed deviation between the speed command value and a speed estimate value of the motor 2. The speed command value is, for example, supplied from a higher-level control apparatus such as a programmable controller (PLC). The speed estimate value of the motor 2 will be explained below.

The current control unit 6 is connected to the output of the speed control unit 5. The current control unit 6 outputs a control amount generated in accordance with the difference between a drive torque command value supplied from the speed control unit 5 and a torque current component supplied to the motor 2.

The PWM control unit 7 is connected to the output of the current control unit 6, and the output is connected to the inverter 8. The PWM control unit 7 controls the inverter 8 by means of PWM control. As a result thereof, the PWM control unit 7 can drive the motor 2 by means of PWM control. The PWM control unit 7 may output a voltage and current for driving the motor 2 in accordance with the control amount generated by the current control unit 6.

For example, the wiring connected to the output of the inverter 8 may be provided with current transformers for detecting the phase currents of the respective phases. Current transformers may be provided on the wiring for at least two phases among the wiring for the respective phases in three-phase alternating current. The current control unit 6 may implement current control based on instantaneous values of the phase currents detected by the current transformers.

The input to the phase/speed detection unit 3 is connected to the output of the resolver 2A. The phase/speed detection unit 3 samples, with a prescribed period, a continuous-time speed detection signal ωFBK output from the resolver 2A, thereby converting the signal ωFBK to discrete-time data (hereinafter referred to simply as speed detection signal ωFBK data) that is the result of quantization by an A/D conversion unit. The sampling may be performed with a period allowing the signal of a target frequency component to be reproduced. The speed detection signal ωFBK is a signal that is used as so-called speed feedback.

The rotation speed estimation unit 4 comprises, for example, an FFT analysis processing unit 41 (indicated as "FFT ANALYSIS" in the drawings) and a speed compensation computation unit 42.

The FFT analysis processing unit 41 uses the discrete-time data based on the detection result from the resolver 2A to implement FFT analysis of the speed detection signal ωFBK.

For example, the input to the FFT analysis processing unit 41 is connected to the output of the phase/speed detection unit 3. The FFT analysis processing unit 41 acquires the discrete-time speed detection signal ωFBK data output from the phase/speed detection unit 3, and performs an FFT (Fast Fourier Transform) analysis on the speed detection signal ωFBK data, thereby transforming it to data in the frequency domain. The FFT analysis processing unit 41 may, for example, be an FFT analyzer, or may be hardware capable of implementing computational processes that are equivalent to or similar to those of an FFT analyzer. The number of items of data in the time domain, i.e., the length of the time windows, may be decided in accordance with the accuracy required in the analysis results in the frequency domain.

If the circumstances are such that the motor 2 is controlled to be at a constant speed, then noise that is dependent on deviation will be superimposed on the speed detection signal ωFBK as continuously repeating noise. Therefore, even at specific times, if the speed detection signal ωFBK data has been obtained as a result of sampling over a prescribed time period, then the data can reproduce the characteristics of the above-mentioned noise.

The speed compensation computation unit 42 uses time-domain data based on an FFT analysis result (frequency-domain data) from the FFT analysis processing unit 41 and the speed detection signal ωFBK data (time-domain data) to generate an estimated value of the rotation speed of the motor 2, and outputs this estimated value. An inverse FFT analysis method may be used to generate time-domain data from the FFT analysis result (frequency-domain data). The speed compensation computation unit 42 implements inverse FFT analysis on the FFT analysis result (frequency-domain data) from the FFT analysis processing unit 41, and obtains time-domain data based thereon.

For example, the speed compensation computation unit 42 comprises an eccentricity compensation computation unit 421 (indicated as "ECCENTRICITY COMPENSATION" in the drawings) and an adder 422. The input to the speed compensation computation unit 42 (the input to the eccentricity compensation computation unit 421) is connected to the output of the resolver 2A. The output of the speed compensation computation unit 42 is connected to a first input to the adder 422. A second input to the adder 422 is connected to the output of the resolver 2A. The adder 422 adds a computation result from the speed compensation computation unit 42, which is supplied to the first input thereof, and the speed detection signal ωFBK output by the resolver 2A. In this way, the speed compensation computation unit 42 uses the speed detection signal ωFBK, which is supplied from the resolver 2A, and the FFT analysis result from the FFT analysis processing unit 41, to generate an estimated value of the rotation speed of the motor 2.

For example, the FFT analysis processing unit 41 generates, as a result of the FFT analysis of the speed detection signal ωFBK, an amplitude spectrum of the speed detection signal ωFBK and a phase spectrum of the speed detection signal ωFBK. The FFT analysis processing unit 41 extracts amplitude components for the respective frequencies in the speed detection signal ωFBK based on the amplitude spectrum of the speed detection signal ωFBK. The FFT analysis processing unit 41 may extract phase components for the respective frequencies in the speed detection signal ωFBK based on the phase spectrum of the speed detection signal ωFBK. For example, by specifying a frequency, the FFT analysis processing unit 41 can compute the phase component of a signal with that frequency. In this case, the rotation speed estimation unit 4 can correct the speed detection signal ωFBK based on the amplitude spectrum and the phase spectrum thereof, thereby generating an estimated value of the rotation speed of the motor 2. The frequency component of a signal with a specific frequency, as mentioned above, refers to the signal component within a prescribed frequency width range with respect to a central frequency, wherein the central frequency is the specific frequency.

For example, the eccentricity compensation computation unit 421 of the speed compensation computation unit 42, based on the amplitude spectrum, computes a specific frequency component associated with a rotational frequency of the resolver 2A, and the magnitude of the frequency component. The eccentricity compensation computation unit 421 of the speed compensation computation unit 42 computes phase information of the specific frequency component with respect to a standard phase based on the above-mentioned phase spectrum. The eccentricity compensation computation unit 421 of the speed compensation computation unit 42 generates a speed compensation amount based on the magnitude of the specific frequency component and the phase information of the specific frequency component. An adder 422 of the speed compensation computation unit 42 uses the speed compensation amount to correct the speed detection signal ωFBK, and this corrected result may be generated as the estimated value of the rotation speed of the motor 2.

The electric motor speed control apparatus 10 may, for example, include a processor such as a CPU, and some or all of the functional units, such as the rotation speed estimation unit 4, the speed control unit 5, the current control unit 6 and the PWM control unit 7 may be realized by the processor executing a prescribed program, or by a combination of electric circuits (circuitry). The electric motor speed control apparatus 10 may utilize storage areas in an internally provided storage unit to perform respective data transfer processes and computation processes for analysis by executing prescribed programs by means of the processor.

Figure 2:
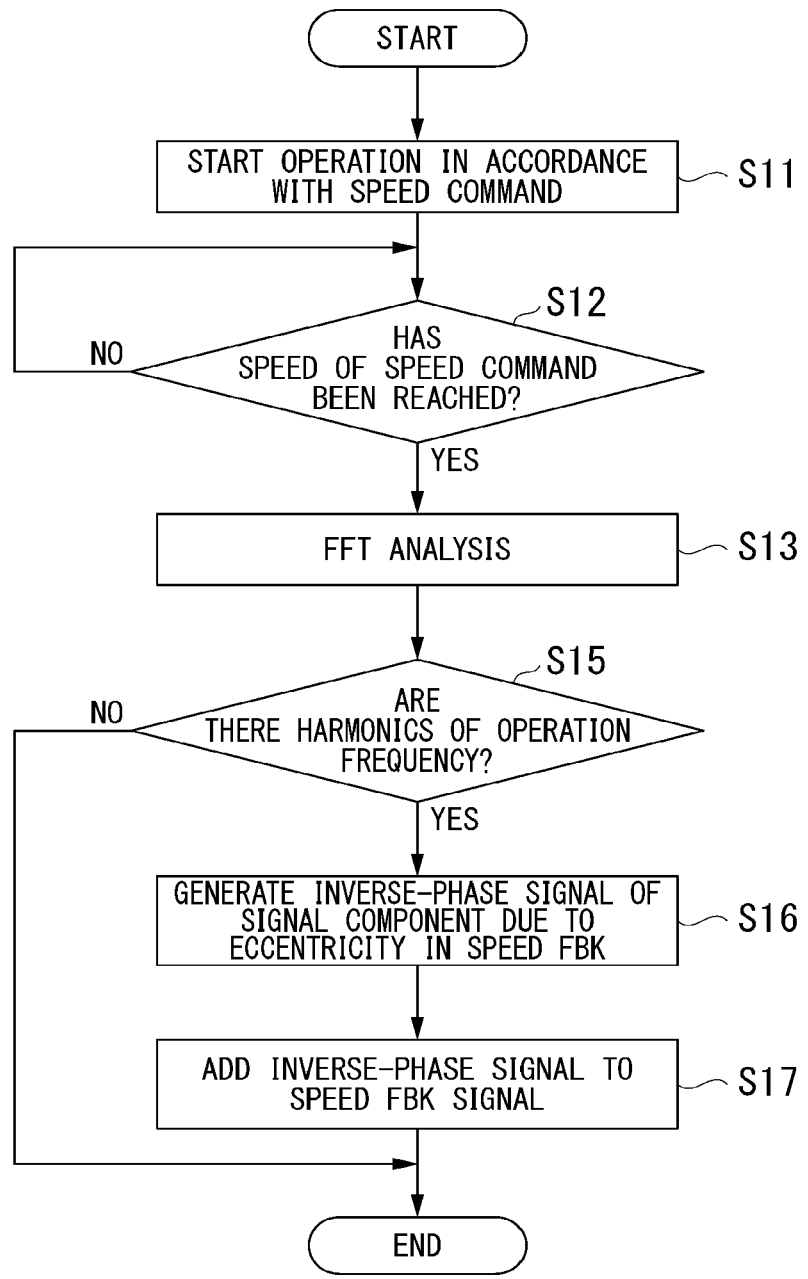
FIG. 2 is a flow chart of speed estimation control based on usage conditions for the first embodiment.

Referring to FIG. 2, processing associated with speed estimation control under usage conditions (first usage conditions) for the present embodiment will be explained. The first usage conditions associated with this speed estimation control are for the case in which the frequency, the amplitude and the phase can be acquired by FFT analysis. FIG. 2 is a flow chart of speed estimation control based on the usage conditions (first usage conditions) for the first embodiment.

After installing a motor 2 and a resolver 2A, a user locks the shaft of the resolver 2A to the shaft of the motor 2 so that the resolver 2A rotates in conjunction with rotation of the shaft of the motor 2. At this stage, the positional relationship between the motor 2 and the resolver 2A is adjusted so as to reduce the above-mentioned deviation.

The speed control unit 5 starts operating in accordance with a speed command (speed command value) (step S11). The speed control unit 5 determines whether or not the speed estimate value of the motor 2 has reached the speed of a speed command (speed command value) (step S12), and repeats the process in step S12 until the speed estimate value reaches the speed of the speed command value. When the speed estimate value reaches the speed of the speed command value and a control state with constant-speed operation is attained, the FFT analysis processing unit 41 implements FFT analysis on the speed detection signal ωFBK (step S13), and acquires information regarding the frequency, amplitude and phase of the speed detection signal ωFBK.

The speed compensation computation unit 42 determines whether or not there are harmonics of the fundamental frequency (referred to as the operational frequency) of the motor 2 during constant-speed operation (step S15), and if there are no harmonics, then the series of processes ends.

If the above-mentioned harmonics are present, then the speed compensation computation unit 42 generates an inverse-phase signal of a signal component due to eccentricity in the speed detection signal ωFBK (indicated as "speed FBK" in the drawings) (step S16) and adds the inverse-phase signal to the speed detection signal ωFBK (indicated as "speed FBK" in the drawings) (step S17), and the series of processes ends.

By obtaining phase information regarding the signal component that is superimposed due to eccentricity based on an FFT analysis result in this way, the rotation speed estimation unit 4 can use phase information obtained based on the result of FFT analysis of the speed detection signal ωFBK, the phase information being that of the signal component that is superimposed due to eccentricity. As a result thereof, the rotation speed estimation unit 4 can estimate the speed of the motor 2 based on the speed detection signal ωFBK.

Figure 4:
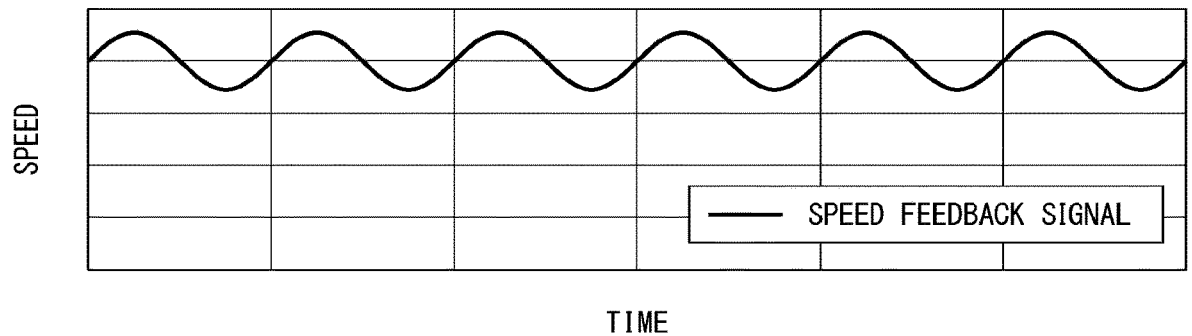
FIG. 4 is a diagram for explaining a speed feedback signal for the case in which there is eccentricity in the first embodiment.

FIG. 4 is a diagram for explaining a speed feedback signal for the case in which there is eccentricity in the first embodiment. The graph shown in FIG. 4 is a model of the results of observation of the output signal of the resolver 2A over a prescribed time period. This graph indicates the relationship of the magnitude of the speed (vertical axis) with respect to time elapsed (horizontal axis) based on the output signal from the resolver 2A. This output signal is used as a speed feedback signal.

If the state is an ideal state without eccentricity (Comparative Example), then when the motor 2 is rotating at a constant speed, the value of the detection result from the resolver 2A, i.e., the magnitude of the speed, becomes constant. However, if the state is one with eccentricity, as in the embodiment, then the value of the detection result from the resolver 2A, i.e., the amplitude of the speed, will be observed to fluctuate periodically, even if the motor 2 is rotating at a constant speed.

Figure 5:
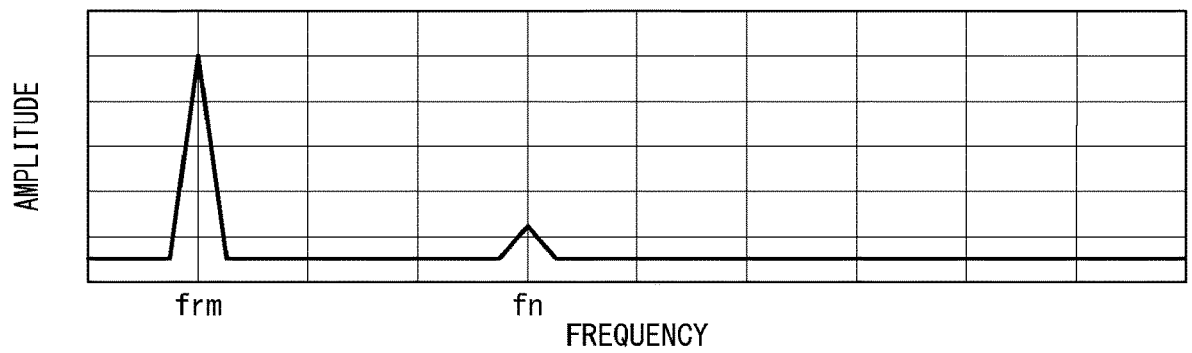
FIG. 5 is a diagram for explaining a result of FFT analysis processing of the speed feedback signal indicated in FIG. 4.

FIG. 5 is a diagram for explaining a result (amplitude spectrum) of FFT analysis processing of the speed feedback signal indicated in FIG. 4. The graph shown in FIG. 5 indicates the amplitude spectrum with respect to frequency (horizontal axis). As a result of FFT analysis processing of the speed feedback signal indicated in FIG. 4, the amplitude spectrum shown in FIG. 5 is obtained. The frequency frm is the frequency component corresponding to the rotation speed ωrm of the motor. From this analysis result, it can be understood that a frequency component centered at the frequency fn, which is N times (N being an integer equal to or greater than 2) the frequency frm, was included in addition to the frequency frm.

Figure 6:
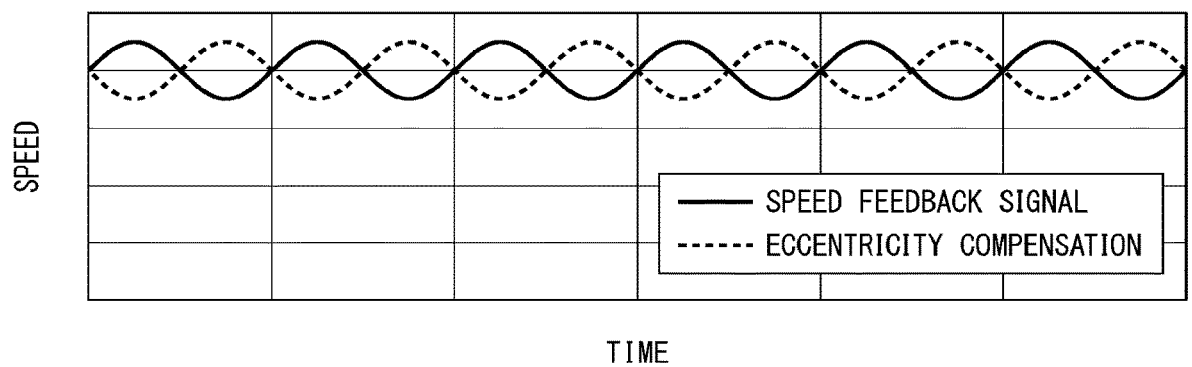
FIG. 6 is a diagram for explaining the speed feedback signal indicated in FIG. 4 and a signal for eccentricity compensation.

A signal for eccentricity compensation of such a frequency component superimposed on the output signal of the resolver 2A will be explained with reference to FIG. 6. FIG. 6 is a diagram for explaining the speed feedback signal indicated in FIG. 4 and a signal for eccentricity compensation.

An eccentricity compensation signal obtained by extracting the frequency component centered at the frequency fn and adjusting the phase with respect to the fluctuation component included in the speed feedback signal to adjust the phase to have an inverse-phase relationship is indicated. In FIG. 6, the average value of the eccentricity compensation signal indicates the state in which a direct current level has been adjusted to match the average value of the speed feedback signal.

Figure 7:
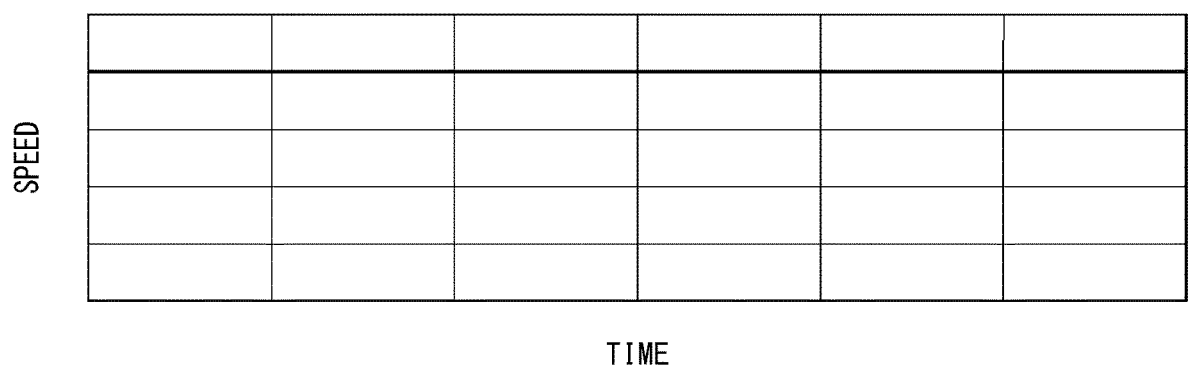
FIG. 7 is a diagram for explaining a result obtained by using the signal for eccentricity compensation to compensate the speed feedback signal indicated in FIG. 4.

FIG. 7 is a diagram for explaining a result of using the signal for eccentricity compensation to compensate the speed feedback signal indicated in FIG. 4. The graph shown in FIG. 7 indicates the relationship of the magnitude of the speed (vertical axis) with respect to the time elapsed (horizontal axis). This graph indicates the result of adding the eccentricity compensation signal and the fluctuations in the speed feedback signal.

According to the embodiment described above, a signal for removing noise (fluctuations) due to eccentricity is generated by determining the frequency (a frequency that is N times the motor frequency), amplitude and phase of the noise (fluctuation) component due to eccentricity from a result of FFT analysis of the speed detection signal $\omega$FBK. The signal generated thereby has a frequency and amplitude that are the same as the frequency and amplitude of the noise component due to eccentricity, but with the phase relatively shifted by 180 degrees to form an inverse-phase signal. The noise component due to eccentricity can be removed by adding this signal to the speed detection signal $\omega$FBK.

Second Embodiment

The second embodiment will be explained. In the first embodiment, an example of the case in which frequency, amplitude and phase information regarding the noise (fluctuation) component due to eccentricity can be acquired from a result of FFT analysis of the speed detection signal $\omega$FBK was explained. In the present embodiment, the case in which, of the above, the phase information cannot be acquired will be explained.

Figure 3:
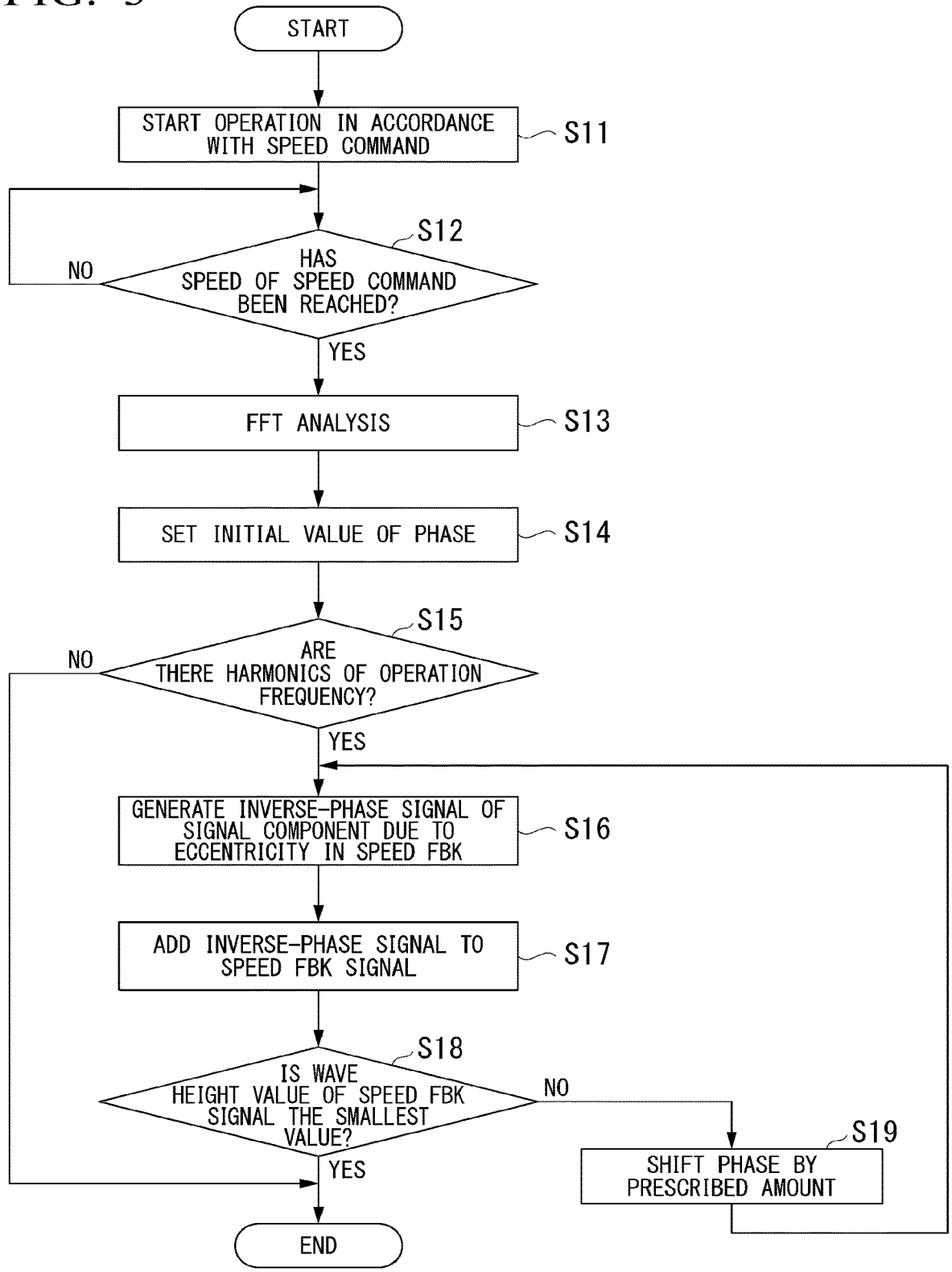
FIG. 3 is a flow chart of speed estimation control base on usage conditions for a second embodiment.

Referring to FIG. 3, processing associated with speed estimation control under usage conditions (second usage conditions) for the present embodiment will be explained. The second usage conditions associated with this speed estimation control are for the case in which the frequency and amplitude can be acquired by FFT analysis, but the phase cannot be acquired. FIG. 3 is a flow chart of speed estimation control based on second usage conditions.

After installing a motor 2 and a resolver 2A, the user locks the shaft of the resolver 2A to the shaft of the motor 2 so as to rotate in conjunction with rotation of the shaft of the motor 2.

The speed control unit 5 starts operating in accordance with a speed command (speed command value) (step S11). The speed control unit 5 determines whether or not the speed estimate value of the motor 2 has reached the speed of a speed command (speed command value) (step S12), and repeats the process in step S12 until the speed estimate value reaches the speed of the speed command value. When the speed estimate value reaches the speed of the speed command value and a state of constant-speed operation is attained, the FFT analysis processing unit 41 implements FFT analysis (step S13).

Next, the speed compensation computation unit 42 sets an initial value for the phase (step S14).

The speed compensation computation unit 42 determines whether or not there are harmonics of the fundamental frequency (referred to as the operational frequency) of the motor 2 during constant-speed operation (step S15), and if there are no harmonics, then the series of processes ends.

If the above-mentioned harmonics are present, then the speed compensation computation unit 42 generates an inverse-phase signal of a signal component due to eccentricity in the speed detection signal $\omega$FBK (indicated as "speed FBK" in the drawings) (step S16), and adds the inverse-phase signal to the speed detection signal $\omega$FBK (indicated as "speed FBK" in the drawings) (step S17).

The speed compensation computation unit 42 determines whether or not the wave height value of the estimated value of the speed detection signal $\omega$FBK is the smallest value (step S18), and if the wave height value of the estimated value of the speed detection signal $\omega$FBK is the smallest value, then the phase at that point in time is assumed to be a phase having an inverse-phase relationship, and the series of processes ends.

In the case in which the wave height value of the estimated value of the speed detection signal $\omega$FBK is not the smallest value, the rotation speed estimation unit 4 decides on a phase, as the new phase, obtained by adding a prescribed amount to the phase and thereby shifting the phase by the prescribed amount, which is predetermined (step S19), and repeats the process from step S16.

The reason that an inverse-phase relationship can be considered to be fulfilled if the wave height value of the estimated value of the speed detection signal $\omega$FBK is the smallest value is because, if the signal component due to eccentricity is superimposed, then the wave height value of the speed detection signal $\omega$FBK will become that much larger. When a signal is added such that the superimposed signal component disappears, in other words, when an inverse-phase signal is added, the wave height value of the estimated value of the speed detection signal $\omega$FBK in that state becomes the smallest value. Therefore, the optimal phase can be decided by stopping the search for the phase at the time it is detected that the wave height value of the estimated value of the speed detection signal $\omega$FBK has become the smallest value (the minimum value).

Thus, even if phase information regarding the signal component that is superimposed due to eccentricity cannot be obtained from the FFT analysis result, the rotation speed estimation unit 4 can estimate the speed of the motor 2 based on the speed detection signal $\omega$FBK.

In this case, by obtaining phase information regarding the signal component (noise component) that was superimposed due to eccentricity based on the FFT analysis result, the rotation speed estimation unit 4 can use the phase information obtained based on the result of FFT analysis of the speed detection signal $\omega$FBK as phase information for the signal component superimposed due to eccentricity. As a result thereof, the rotation speed estimation unit 4 can estimate the speed of the motor 2 based on the speed detection signal $\omega$FBK.

According to the embodiment described above, a signal for removing noise (fluctuations) due to eccentricity is generated by identifying the frequency (a frequency that is N times the motor frequency), amplitude and phase of the noise (fluctuation) component due to eccentricity from the result of FFT analysis of the speed detection signal $\omega$FBK. The signal generated thereby has a frequency and amplitude that are the same as the frequency and amplitude of the noise component due to eccentricity, but with the phase relatively shifted by 180 degrees to form an inverse-phase signal. The magnitude of the noise component due to eccentricity can be reduced by adding this signal to the speed detection signal $\omega$FBK.

According to at least one of the embodiments explained above, the electric motor speed control apparatus comprises a rotation speed estimation unit and a control unit. The rotation speed estimation unit uses a result of FFT analysis of the speed detection signal ωFBK, which is based on a detection result of a resolver detecting the rotation speed of the electric motor, and a speed detection signal ωFBK, to generate an estimated value of the rotation speed of the electric motor. The control unit implements speed control so as to reduce the deviation between the estimated value of the rotation speed and a speed command value for speed control of the electric motor.

Although a number of embodiments of the present invention have been explained above, these embodiments merely present examples and are not intended to limit the scope of the invention. These novel embodiments may be implemented in various other forms, and various omissions, replacements and variations may be made within a range not departing from the spirit of the invention. These embodiments and variations thereof are included within the scope and the spirit of the invention, and are included within the scope of the invention as recited in the claims and within the range of equivalents thereof. Additionally, the embodiments described above can be implemented by being combined with each other.

REFERENCE SIGNS LIST

1 Motor drive system
2 Motor
4 Rotation speed estimation unit
5 Speed control unit
6 Current control unit
7 PWM control unit
8 Inverter
10 Electric motor speed control apparatus
41 FFT analysis processing unit
42 Speed compensation computation unit

The invention claimed is:

1. An electric motor speed control apparatus comprising:
a rotation speed estimation unit that generates an estimated value of a rotation speed of an electric motor by using a result of FFT analysis of a speed detection signal ωFBK, which is based on a detection result from a resolver for detecting the rotation speed of the electric motor, and the speed detection signal ωFBK; and
a control unit that implements speed control so as to reduce deviation between the estimated value of the rotation speed and a speed command value for speed control of the electric motor; wherein
a shaft of the electric motor and a shaft of the resolver are coupled, and when the control unit is controlling the electric motor at a constant speed, fluctuations in the speed detection signal ωFBK are generated due to eccentricity of the shaft of the resolver with respect to the shaft of the electric motor; and
the rotation speed estimation unit generates an estimated value of the rotation speed by
when deciding on a phase difference between the estimated value of the rotation speed and the speed detection signal ωFBK, defining one phase difference among phase differences with values different from each other, and adding the estimated value of the rotation speed and the speed detection signal ωFBK, with the defined phase difference provided therebetween,
repeatedly implementing computations in which the phase difference value is changed, and the estimated value of the rotation speed and the speed detection signal ωFBK are added,
selecting, from among the repeated implementations, the phase difference for which a component from the fluctuations due to eccentricity is reduced as a result of the adding computations, and
using the selected phase difference to add the estimated value of the rotation speed and the speed detection signal ωFBK.

2. The electric motor speed control apparatus according to claim 1, wherein
the rotation speed estimation unit comprises:
an FFT analysis processing unit that performs FFT analysis on the speed detection signal ωFBK; and
a speed compensation computation unit that generates the estimated value of the rotation speed by using the speed detection signal ωFBK and the result of the FFT analysis.

3. The electric motor speed control apparatus according to claim 2, wherein
the FFT analysis processing unit
generates, as the FFT analysis result from the FFT analysis, an amplitude spectrum of the speed detection signal ωFBK and a phase spectrum of the speed detection signal ωFBK; and
the speed compensation computation unit
generates the estimated value of the rotation speed by correcting the speed detection signal ωFBK based on the amplitude spectrum and the phase spectrum.

4. The electric motor speed control apparatus according to claim 3, wherein
the speed compensation computation unit
calculates a specific frequency component associated with a rotational frequency of the resolver and a magnitude of the frequency component based on the amplitude spectrum;
calculates phase information of the specific frequency component based on the phase spectrum;
generates a speed compensation amount based on the magnitude of the specific frequency component and the phase information of the specific frequency component; and
uses the speed compensation amount to correct the speed detection signal ωFBK, and generates a result of the correction as the estimated value of the rotation speed.

5. The electric motor speed control apparatus according to claim 3, wherein
the control unit
controls the rotation speed of the electric motor based on the speed command value associated with speed control of the electric motor and the corrected speed detection signal ωFBK.

6. The electric motor speed control apparatus according to claim 2, wherein
the FFT analysis processing unit
generates, as the FFT analysis result from the FFT analysis, an amplitude spectrum of the speed detection signal ωFBK; and
the speed compensation computation unit
generates the estimated value of the rotation speed by correcting the speed detection signal ωFBK based on the amplitude spectrum and an adjusted phase.

7. The electric motor speed control apparatus according to claim 6, wherein
the speed compensation computation unit calculates a specific frequency component associated with a rotational frequency of the resolver and a magnitude of the frequency component based on the amplitude spectrum;

adjusts the phase;

generates a speed compensation amount based on the magnitude of the specific frequency component and the adjusted phase; and uses the speed compensation amount to correct the speed detection signal ωFBK, and generates a result of the correction as the estimated value of the rotation speed.

8. An electric motor speed control method that includes:

steps of generating an estimated value of a rotation speed of an electric motor by using a result of FFT analysis of a speed detection signal ωFBK, which is based on a detection result from a resolver for detecting the rotation speed of the electric motor, and the speed detection signal ωFBK; and implementing speed control so as to reduce deviation between the estimated value of the rotation speed and a speed command value for speed control of the electric motor; wherein a shaft of the electric motor and a shaft of the resolver are coupled, and in controlling the electric motor at a constant speed, fluctuations in the speed detection signal ωFBK are generated due to eccentricity of the shaft of the resolver with respect to the shaft of the electric motor; and the step of generating an estimated value of the rotation speed is included, by when deciding on a phase difference between the estimated value of the rotation speed and the speed detection signal ωFBK, defining one phase difference among phase differences with values different from each other, and adding the estimated value of the rotation speed and the speed detection signal ωFBK, with the defined phase difference provided therebetween, repeatedly implementing computations in which the phase difference value is changed, and the estimated value of the rotation speed and the speed detection signal FBK are added, selecting, from among the repeated implementations, the phase difference for which a component from the fluctuations due to eccentricity is reduced as a result of the adding computations, and using the selected phase difference to add the estimated value of the rotation speed and the speed detection signal ωFBK.

* * * * *